Patented Sept. 12, 1933

1,926,854

UNITED STATES PATENT OFFICE 1,926,854

SOLDER

Conral C. Callis and Ralph B. Derr, Oakmont, Pa., assignors to Aluminum Company of America, Pittsburgh, Pa., a corporation of Pennsylvania No Drawing. Application July 30, 1932
Serial No. 627,145

1 Claim. (Cl. 75—1)

This invention relates to a composition of matter for use in the joining of metal bodies by soldering, and while adaptable for such use with various metals it is particularly suitable for the soldering of aluminum and alloys thereof in which aluminum is the predominating constituent.

The primary object of this invention is to provide a soldering composition which is strong, ductile, readily applied, resistant to corrosion and capable of forming a strong, adherent bond with the metal being soldered.

Our novel solder composition consists of a mixture of tin, zinc and aluminium in which the tin and zinc are present in substantially equal amounts and the aluminium is present to the extent of 2.5 to 5 per cent of the whole. Thus this solder has a composition of about 47.5 to 49 per cent by weight of tin, about 47.5 to 49 per cent by weight of zinc, and about 2.5 to 5 per cent by weight of aluminum.

While various solders containing these constituents have been used in the past, but in different proportions than those of our composition, these previous solders have proven to be unsuitable for obtaining a permanent soldered joint between two bodies of aluminum or bodies consisting of alloys of high aluminum content, primarily because of failure under corrosive influences, as is attested by the fact that soldered specimens made in the manner hereinafter described have withstood immersion in a high corrosive 5 per cent calcium chloride solution for a period of 5 months without failure of the joint. The specimens were prepared by placing two strips of approximately ⅛ inch thick aluminum sheet edge to edge and applying solder of the composition given by means of an iron at a temperature between 700 and 800 degrees Fahrenheit.

The solder was prepared by melting the three constituents together and casting the resulting mixture into the form of sticks which were melted down and applied to the joint with the iron. For the compounding of this solder it is preferable, but not necessary, to use commercially pure metal, as small amounts of impurities may cause drossing and are likely to result in the formation of inferior joints. By the use of the pure constituents the joints formed are found to be decidedly more resistant to corrosion than if secondary or remelted metal is used.

The solder can be applied by the iron or by pouring, dipping or any other of the well known soldering processes, either with or without the use of a flux. However, if the metal to be soldered has not been subjected to previous mechanical or chemical cleaning for the purpose of removing dirt and the oxide coating normally present on aluminum bodies, we prefer to use fluxes of the compositions shown in our copending applications, Serial No. 639,841 and Serial No. 639,842, filed October 27, 1932, and Serial No. 649,325, filed December 29, 1932.

Such a flux may consist, for example, of about 5 per cent stannous bromide, 40 per cent cadmium chloride, 20 per cent cadmium iodide, 25 per cent ammonium chloride, 2 per cent ammonium fluoride, and 8 per cent zinc chloride, by weight, to which is added a vehicle. This vehicle consists of a mixture of chlorinated diphenyl and chlorinated naphthalene melted together and to which is added up to about 15 per cent by weight of para-dichlor-benzene or cyclo hexanol to secure any desired degree of fluidity. The salt flux and the vehicle are finally mixed together in the approximate proportions of about 4 parts of the salts to 6 parts of the vehicle.

Because of ease of application of this solder, if reasonable care is exercised in applying the solder, uniformly strong, adherent and ductile joints can be formed by any of the known soldering processes.

We claim:

A composition of matter for soldering aluminum and its alloys consisting of about 47.5 to 49 per cent by weight of tin, about 47.5 to 49 per cent by weight of zinc, and about 2.5 to 5 per cent by weight of aluminum.

CONRAL C. CALLIS.
RALPH B. DERR.